Patented Mar. 4, 1930

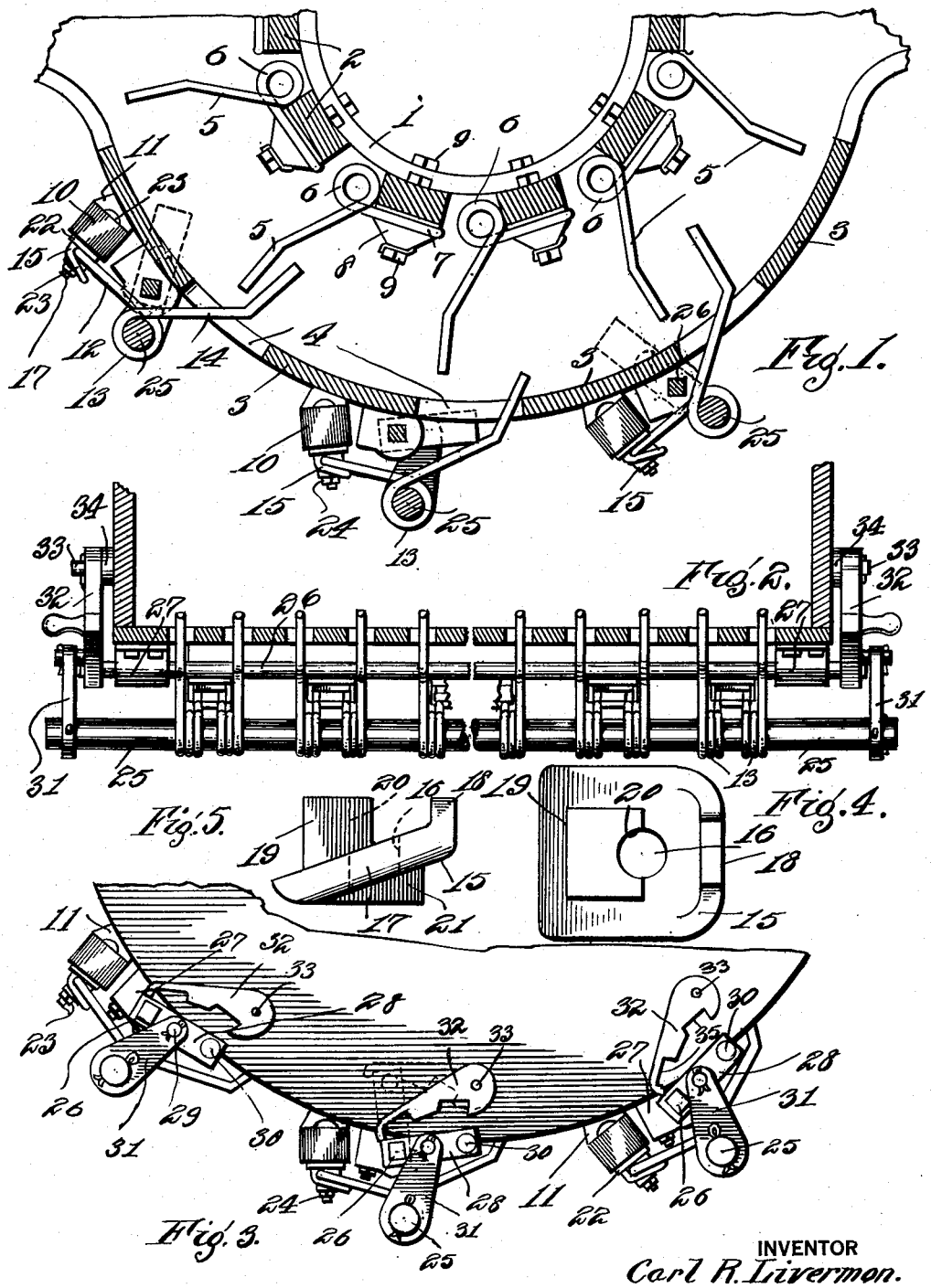

1,749,040

UNITED STATES PATENT OFFICE

CARL R. LIVERMON, OF ROXOBEL, NORTH CAROLINA

STRIPPING-FINGER ADJUSTMENT FOR THRASHING MACHINES

Application filed March 22, 1928. Serial No. 263,733.

This invention relates to thrashing machines, and is more particularly concerned with those machines which operate upon the pod or hull type of crops to strip the pods or hulls from the vines or stems upon which they are grown. Such machines employ rows of stripping fingers which engage and strip the pods or hulls from the vines as they are forced between these fingers. In damp or wet weather, the vines and stems of the crop are tougher and more difficult to break, so that the stripping of the pods or hulls requires the use of a maximum number of stripping fingers. When, through weather conditions, the crop to be harvested, is dry, the stems are brittle and the pods and hulls are easily stripped from the vines. If the same or maximum number of fingers is used under these conditions, some pods will be broken and portions of the brittle vines and stems will be also broken into small pieces and will mingle with the stripped pods as they fall from the concave, increasing the difficulty of cleaning and finally separating the pods.
It is, therefore, necessary to reduce the number of stripping fingers in use to prevent pod breakage and the formation of small bits of stem and vine through breakage which pass with the pods as trash or chaff and thus greatly increase and practically prevent separation of the pods.

A type of trashing machine employing such rows of stripping fingers and to which the present invention is applicable and in which it is advantageously used is disclosed in my application, Serial No. 92,900 for peanut thrashing machine and employs a plurality of revolving drums or cylinders mounted in cooperating concaves, the drums having stripping fingers extending radially outward from their peripheries cooperating with rows of stripping fingers mounted on the exterior of their concaves and projecting therethrough to engage and strip the pods or shells from the vines as they are forced past by the drum fingers.

In accordance with the present invention, provision is made for withdrawing from or projecting into the interior of the concave, at will, individual rows or gangs of stripping fingers as required by the conditions of the particular crop being thrashed. While the invention, in principle, is not limited to a particular type of machine or finger, it will be shown as applied to a cylinder and concave type of machine and the particular form of finger of my application aforesaid as best exemplifying its application and practical use.

A feature of the invention comprises, in combination with a row or gang of spring fingers, of a common connecting member therefor, and manually operable means having connection with said member and operable to move the stripping ends of the fingers inwardly or outwardly relatively to their working zone.

Another feature of the invention consists of a spring finger having an anchoring portion or loop and an anchor mount therefor constructed to permit swinging movement of the finger to and fro and providing a loose mounting which prevents crystallizing vibration of the finger.

The mechanism embodying these and other features of the invention is described in the following detailed specification which is to be read in conjunction with the accompanying drawings forming part thereof and in which:—

Figure 1 is a transverse vertical section through part of the cylinder and concave of a thrashing machine of the type shown in my co-pending application above referred to with the adjustment means of the present invention incorporated therein.

Figure 2 is a longitudinal vertical section through the concave of Figure 1 with the finger gang adjustment means mounted thereon and appearing in elevation.

Figure 3 is an end elevation of the concave and adjustment means, with the fingers appearing in their withdrawn position.

Figure 4 is a top plan view of the finger anchoring cap piece or mount.

Figure 5 is a side elevation thereof.

In thrashing machines of the type disclosed in my application above referred to and as shown herein, a rotatable cylinder is provided by end drums 1 spanned by a series of longitudinally extending slats 2 bolted to and carried by the drums. A concentric and cooperating concave 3 is appropriately spaced from the cylinder and is provided with a plurality of rows of circumferentially spaced slots 4 extending in longitudinal alinement lengthwise of the concave through which stripping fingers mounted upon the exterior of the concave are adapted to extend to cooperate with the spring fingers 5 mounted upon and extending substantially radially from the peripheral surface of the cylinder represented by the slats 2. These fingers 5 are provided with intermediate spring coils 6 and with U-shaped bases 7 mounted over the slats 2 and housed in the grooved base of a cap plate 8, the latter being held onto the slats by bolts 9. The cylinder with its spring fingers 5 is mounted for rotation in thrashing machines of this type and a series of rows of longitudinally extending stripping fingers are mounted upon the exterior of the concave with their stripping ends arranged for projection through the slots 4 toward and away from the cylinder and to and from positions of cooperation with the spring fingers 5 on the rotating cylinder. When the fingers are projected in through the slots 4 and are held within the concave they are effective to strip the pods or hulls from the vines or stems which are drawn past them by the spring fingers 5 of the cylinder. When, as before explained, the vines or stems are dry and brittle, it is highly desirable to reduce the number of concave stripping fingers to prevent fine breakage of stems and damage to the pods or hulls. The series of stripping fingers mounted upon the exterior of the concave 3, with their ends projectible through the slots 4 thereof, are mounted in accordance with the present invention for projection or retraction relatively to the slots and working zone within the concave as groups or units, which as shown, represent a longitudinally extending row of fingers.

Slats 10 extend longitudinally of the concave in parallel, circumferentially spaced, relation and are inclined relatively to the periphery of the concave by means of wedges 11 so that the spring fingers mounted thereon will be inclined toward the concave. These fingers in the form shown herein and in my application aforesaid are formed in pairs, and comprise a substantially U-shaped anchor or base 12, the open ends of which are formed as spring coils 13 from which project outwardly the stripping finger portions 14, the ends of which are bent at an angle to incline them more or less in the radial line of the cylinder. The bases 12 are mounted on and loosely anchored to the slats 10 by a mount or cap plate of special construction shown in detail in Figures 4 and 5. This cap plate indicated generically at 15 is of generally rectangular configuration and is formed with an approximately central bolt bore 16 therethrough and on one face is formed with what in effect is an annular recess tapering in depth and housing the U base of the double spring finger. The intermediate and main body portion 17 of the cap plate is of rectangular form and is provided with a front wall 18 at which point the recess is of minimum depth and with a spaced stud 19 upstanding therefrom with its front edge formed with a semi-circular bearing face 20 alined with the bolt hole 16. A boss 21 at the lower face of the intermediate portion 17 is of triangular shape in cross section and inclines the intermediate portion 17 at an angle upwardly toward the wall 18. The upper edge of the wall 18 and the upper surface of the stud 19 are in the same plane and represent the inner face of the cap plate. The inner face of the wall 18 and the sides of the stud 19 define an annular recess seating the U base of the spring fingers. These cap plates 15 are mounted upon the slats 10 at spaced intervals lengthwise of the concave, determined by the positions of the slots 4 therein, the recessed face of the cap plates abutting washers 22 mounted upon the outer faces of the slats 10 and bolts 23 extending through the slats 10, washers 22 and bores 16 of the cap plates which are drawn down over their washers and held in position by means of nuts 24 threaded upon the outer ends of the bolts and engaging the bosses 21 of the cap plates.

The series of rows of double spring fingers mounted in this manner provide also a series of spring coils or loops which are in alinement longitudinally of the concave and exteriorly thereof. To provide for unitary movement of the stripping fingers of each row, rods 25 are inserted through the alined loops or spring coils 13 of the row of fingers. Between these rods and the exterior of the concave and spaced circumferentially therefrom, rock shafts 26 are mounted in bearings 27 secured to the concave at its opposite ends, the outer ends of the rock shaft projecting beyond the bearings 27 and being squared. The squared ends of these rock shafts at and slightly beyond the ends of the concave have mounted thereon, what I may term crank arms 28 having offset outwardly therefrom crank pins 29 and being extended beyond said crank pins and provided with operating handles 30. Links 31 (Figure 2) constituting hangers are mounted on and pinned to the ends of the rods 25 at their lower ends and have their upper ends journalled on the crank pins 29. Since the rock shafts 26 are circumferentially spaced from the rods 25, oscillation of the rock shaft will cause their crank arms, through the connection of the hanger links 31 thereto, to move the rods 25 and their connected rows of stripping fingers toward and from the concave either to project the rows of fingers through the slots 4 and fully within the concave to lie within the working zone for the stripping operation, or to retract them from said zone and substantially from within the concave to a non-operative or non-stripping position. In Figure 1 of the drawings, the central lower row of stripping fingers is shown as retracted while the adjacent and higher rows of fingers are shown projected into the working zone within the concave and in operative stripping position. In Figure 3, the concave stripping fingers are all shown as retracted.

Suitable means must be provided for holding the crank arms in an adjusted position of the stripping fingers. In the embodiment and form shown in the drawings, the rods 25 normally tend by gravity to retract the rows of fingers to an inoperative position, although, if desired, and as obvious, this tendency may be supplemented by other well known means such as springs. In the projected or operative position of the fingers represented by the more elevated concave fingers in Figure 1, the operating crank arms 28 are positioned as indicated in dotted lines and it is necessary, in the construction and under the conditions above noted, to retain these crank arms in this adjusted position of the stripping teeth of the concave. Accordingly as shown in Figures 2 and 3, a dog 32 is pivotally mounted upon the opposite ends of the concave as by means of a pivot stud 33 on a plate 34 attached to said ends and has its lower edge formed with a plurality of stepped notches 35 adapted to engage the upper edge of the cranks 28 in their position of full projection of the stripping fingers, or at an intermediate point of projection when desired. With the crank arms 28 in the position of withdrawal of the fingers as shown in Figure 3, the dogs 32 drop down by gravity to the position shown in said figure and rest against the sides of the crank arms. When the handles 30 are operated to project the fingers into the working zone, the dogs will be lifted by the turning movement of the crank arms and will ride thereover and present one of the notches 35 releasably to hold the crank arms against finger retracting movement through the gravitational tendency due to the weight of the rod 25 and the pressure of the vines, etc. against the fingers.

While I have herein shown and described the invention as applied to a thrasher of the type and finger construction of my application hereinbefore identified, it is to be understood that in principle the invention is applicable to other forms and constructions and that the described and illustrated form thereof is susceptible of modification and adaptation to different structures in consonance with the spirit of the invention and the scope of the appended claims.

What I claim therefore, and desire to secure by Letters Patent is:—

1. In a thrashing machine, a row of loosely anchored stripping fingers having spring coils intermediate of their ends, a bar common to and connecting said fingers intermediate of their ends for bodily movement in unison, manually operable means bodily to project the stripping ends of said fingers as a unit into and bodily to retract them from the zone of the stripping operation, and means for releasably retaining said operating means in a finger adjusted position.

2. In a thrashing machine, a row of movably anchored stripping fingers, a member common to and connecting said fingers intermediate of their ends for bodily movement as a unit, and means connected with said member and manually operable to move said member in opposite directions to cause it bodily to project and retract the stripping ends of said fingers as a unit into and away from the zone of stripping operation, respectively.

3. In a thrashing machine, a row of movably anchored stripping fingers, a member common to and connecting said fingers intermediate of their ends for movement as a unit, and means supporting said member and manually operable to move said member in opposite directions to cause it to project and retract the stripping ends of said fingers as a unit into and away from the zone of stripping operation, respectively.

4. In a thrashing machine, a row of movably anchored stripping fingers having intermediate loops in substantial alinement, a rod extending through said loops and connecting said fingers for movement in unison, hangers supporing the ends of said rod, and manually operable means for moving said hangers and rod in directions to project and retract the stripping ends of said fingers as a unit into and away from the zone of stripping operation, respectively.

5. In a thrashing machine, a row of movably anchored stripping fingers having intermediate loops in substantial alinement, a rod extending through said loops and connecting said fingers for movement in unison, hangers supporting the ends of said rods, a manually oscillable rock shaft, crank arms on said shaft, hangers operatively connecting said crank arms and said rod and supporting said rod and fingers for movement through oscillation of said shaft to project the stripping ends of said fingers into and away from the zone of stripping operation, respectively, and means for releasably retaining said crank arms in an adjusted position of said fingers.

6. In a thrashing machine, a rotatable drum having a plurality of fingers projecting outwardly from its periphery, a cooperating concave spaced from and concentric to said drum, a plurality of rows of stripping fingers extending longitudinally of the concave and movably anchored at one end exteriorly on the concave with their stripping finger portions bodily projectable within and retractible from the interior of the concave through slots therein, a member exteriorly of the concave common to and connecting the fingers of a row intermediate of their ends for bodily movement as a unit, and means connected to said member and manually operable to move said member in opposite directions to cause it bodily to project and retract the stripping portions of said fingers as a unit into and away from the zone of stripping operation within the concave, respectively.

7. In a thrashing machine, a rotatable drum having a plurality of fingers projecting outwardly from its periphery, a cooperating concave spaced from and concentric to said drum, a plurality of rows of stripping fingers extending longitudinally of the concave and movably anchored at one end exteriorly on the concave with their stripping finger portions projectable within and retractible from the interior of the concave through slots therein and with loops formed thereon exteriorly of the concave and adjacent to their anchored ends, a rod inserted through said loops and connecting the fingers of a row for movement in unison, a pair of operating cranks, and hangers connecting said cranks and rod and operated by movement of said cranks to project and retract the stripping portions of said row of fingers as a unit into and away from the zone of stripping operation within said concave.

8. In a thrashing machine, a rotatable drum having a plurality of fingers projecting outwardly from its periphery, a cooperating concave spaced from and concentric to said drum, a plurality of rows of stripping fingers extending longitudinally of the concave and movably anchored at one end exteriorly on the concave with their stripping finger portions projectable within and retractible from the interior of the concave through slots therein and with loops formed thereon exteriorly of the concave and adjacent to their anchored ends, a rod inserted through said loops and connecting the fingers of a row for movement in unison, a manually oscillable rock shaft journaled upon the exterior of the concave, crank arms mounted on said rock shaft, hangers connecting said crank arms with said rod and operated by oscillation of the rock shaft to project and retract the stripping ends of said row of fingers as a unit into and away from the zone of stripping operation within the concave.

9. In a thrashing machine, a rotatable drum having a plurality of fingers projecting outwardly from its periphery, a cooperating concave spaced from and concentric to said drum, a plurality of rows of pairs of spring fingers mounted externally on said concave with stripping end fingers projectable therewith through slots in the concave, said pairs of fingers each having a central anchoring base, intermediate spring coils in spaced relation and dual stripping fingers extended outwardly from said coils in spaced substantially parallel relation, anchoring members for the bases of said dual fingers secured to the exterior of the concave and presenting recesses seating said bases and tapering in depth to permit movement of the fingers toward and from the concave, a rod inserted through the spring coils of the pairs of fingers in a row, a rock shaft journaled on the exterior of said concave, crank arms on said rock shaft, hangers connecting said crank arms with said rod operated by oscillation of the rock shaft and crank arms to project and retract the stripping ends of the pairs of fingers joined by the rod as a unit into and away from the zone of stripping operation within the concave, and means for releasably holding said crank arms in an adjusted position of said fingers.

10. In a thrashing machine, a rotatable cylinder having peripheral fingers, a cooperating concave having slots therein, a plurality of stripping fingers having substantially U-shaped anchoring bases upon the exterior of the concave and provided with stripping finger portions projectable and retractible through said slots, and mounts for the bases of said fingers including a finger base retaining member provided with a recess to receive an anchoring base with the recess tapering in depth to permit limited movement of the finger base and finger toward and from the concave.

11. In a thrashing machine, a rotatable cylinder having peripheral fingers, a cooperating concave having slots therein, a plurality of stripping fingers having substantially U-shaped anchoring bases upon the exterior of the concave and provided with stripping finger portions projectable and retractible through said slots, and anchoring mounts for the bases of said fingers fixed to the exterior of the concave and each comprising a base, and a cap plate seated thereover having a recess thereunder housing the U-base of a finger, said recess being tapered in depth to permit limited movement of the finger toward and from the concave.

CARL R. LIVERMON.